Feb. 4, 1964
M. BONGARD
3,120,563
UREA PREPARATION
Filed July 30, 1959
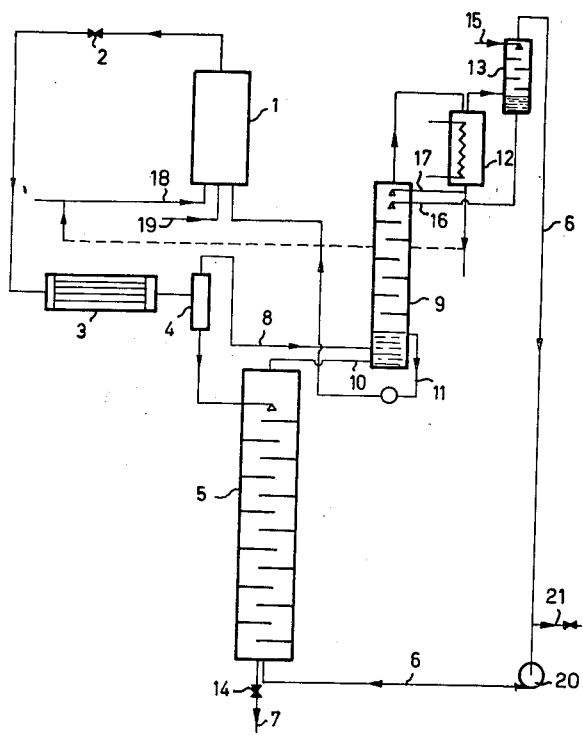
INVENTOR
MATHIEU BONGARD
BY Cushman, Darby & Cushman
ATTORNEYS

3,120,563
UREA PREPARATION
Mathieu Bongard, Geleen, Netherlands, assignor to
Stamicarbon N.V., Heerlen, Netherlands
Filed July 30, 1959, Ser. No. 830,600
Claims priority, application Netherlands Aug. 8, 1958
3 Claims. (Cl. 260—555)

The present invention relates to a process and apparatus for the preparation of urea from ammonia and carbon dioxide.

In this preparation, which is usually carried out by leading liquid ammonia and carbon dioxide into an autoclave in which the reaction mixture is kept at a pressure of at least 160 atm., and a temperature of 150–200° C., the reaction components first react to form ammonium carbamate. This is followed by the conversion of ammonium carbamate into urea and water. Such conversion is, however, not complete and, depending upon the temperature and pressure, an equilibrium is reached at which the degree of conversion is 45–55%. This equilibrium may be shifted towards the formation of urea by adding to the urea synthesis more $NH_3$ than the stoichiometric quantity (i.e. by applying during the synthesis a molar $NH_3/CO_2$ ratio greater than 2).

However, the conversion of ammonium carbamate into urea and water carried out in the above mentioned way, is also far from complete. Thus, the melt leaving the synthesis autoclave still contains, in addition to water and urea, an amount of ammonium carbamate, and, if the reaction mixture is processed at an $NH_3/CO_2$ ratio >2, free $NH_3$.

After expansion of the synthesis melt to a sufficiently low pressure, e.g., a pressure of one atm. gauge, a gaseous mixture of $NH_3$ and $CO_2$ is obtained in addition to an approximately 75% urea solution. Any ammonium carbamate still left in the solution can be completely removed by stripping the solution with a gas, e.g. air, in a stripping column.

As the immediate reintroduction of the $NH_3$—$CO_2$-containing gas mixture obtained in the expansion and in the stripping process into the synthesis apparatus is accompanied by technical difficulties on account of the formation of solid ammonium carbamate at temperatures below 150° C., it has for a long time been the practice merely to process the gas mixture, if necessary after absorption in water, to ammonium sulphate, ammonium nitrate, or ammonium chloride and soda (U.S. Patents 2,056,283 and 2,087,325). The disadvantage of this practice is that the urea production proper is coupled to a considerable production of another nitrogenous compound.

To eliminate this drawback, several proposals have been made, wherein the gas mixture is absorbed in such a small amount of water or other suitable solvent that the resulting concentrated solution, or suspension, can be pumped back into the synthesis apparatus without exercising too adverse an influence on the efficiency of the conversion of ammonium carbamate into urea and water (U.S. Patents 1,898,093 and 2,116,881). However, these alternatives present certain problems. Thus, on the one hand, it is desirable to obtain a pure urea solution free of $NH_3$ and $CO_2$ and this is possible only if the urea melt is expanded to atmospheric or slightly higher pressure. On the other hand, it is also desirable to absorb all of the $CO_2$ which has not been converted into urea in very little water, while forming an ammoniacal ammonium carbamate solution, and this is possible only if the absorption takes place at a relatively high pressure, at least 10 atm. gauge. To attain these objects, one has to use, besides the synthesis apparatus proper, a great deal of auxiliary equipment, viz. an expulsion column for the unconverted free $NH_3$, a first carbamate still with condenser, and a second carbamate still with condenser. These stills and condensers operate at different pressure levels, and as a result considerable expenditure is also required for conduits between these pieces of equipment and for accessory expansion valves, pumps, and pressure safety devices. Moreover, operation and control are complicated. The present invention has for its principal object the provision of a simplified process and apparatus, with attendant elimination of prior art problems.

According to the present invention, the process of preparing urea by reacting $CO_2$ with excess $NH_3$ at elevated temperature and pressure (e.g. 150 to 220° C. at 150 to 400 atmospheres) involves expanding the urea synthesis reaction mixture, which contains urea, carbamate and unreacted $NH_3$, by reducing the pressure thereon to 10–45 atmospheres; removing any gas evolved as a result of said expansion; then decomposing the carbamate in the expanded reaction mixture by heating (e.g. between 110 and 160° C.) at the reduced pressure to form additional urea while simultaneously passing an inert auxiliary gas, such as nitrogen, or air counter-currently through the mixture to strip $NH_3$ and $CO_2$ therefrom; thereafter supplying the resulting gaseous mixture of inert gas, $CO_2$ and $NH_3$ together with any gas evolved in the expansion step, to a $CO_2$-removing zone and passing this mixture of gases counter-currently through an ammonia solution containing little water (e.g. not more than 15 to 30% water on the weight of the solution) whereby essentially all of the $CO_2$ is removed by absorption and an ammoniacal ammonium carbamate solution is obtained, recycling this ammoniacal ammonium carbamate solution to the urea synthesis zone for the preparation of urea therefrom; removing the unabsorbed, essentially $CO_2$-free gaseous mixture of $NH_3$ and inert gas from the $CO_2$-removing zone, cooling this unabsorbed gaseous mixture to condense the major portion of the $NH_3$ therein to liquid $NH_3$, refluxing a portion of the thus condensed $NH_3$ to the $CO_2$-removing zone and supplying the remainder of the condensed $NH_3$ to the urea synthesis zone for reaction with $CO_2$, washing the gaseous mixture of $NH_3$ and inert gas which remains after the $NH_3$-condensation with water thereby obtaining an essentially $NH_3$-free inert gas and ammoniacal washing liquid which may have an ammonia concentration of, for example 50 to 90% by weight; recycling the $NH_3$-free inert gas to the stripping step and feeding the ammoniacal washing liquid to the $CO_2$-removal zone for removal of additional $CO_2$.

It will be recognized that the composition of the urea synthesis reaction mixture prior to its expansion will vary widely depending upon other operation conditions. Usually, however, this mixture will have approximately the following composition by weight: 20 to 35% urea; 20 to 35% ammonium carbamate; 20 to 35% $NH_3$ and 10 to 20% water. As a result of the pressure-reduction from 8 to 20% by weight of the mixture, may be evolved a gas, mainly $NH_3$.

The amount of inert gas utilized in stripping $NH_3$ and $CO_2$ from the reaction mixture during carbamate decomposition may also be varied over a wide range. Sufficient inert gas should be used to effect essentially complete removal of the $CO_2$ and $NH_3$ at the operating temperature. The pressure-reduction and the stripping operation result in the formation of an aqueous urea solution containing from 55 to 75% urea in the usual case, and a gaseous mixture of, for example, 50 to 70% $NH_3$ 15 to 30% $CO_2$, 0–10% $H_2O$ and 5 to 20% inert gas, all percentages being on a weight basis.

As indicated heretofore, the gaseous mixture obtained from the stripping operation and the expansion step is fed to the $CO_2$-removing zone for countercurrent contact with ammonia solution. Usually, from 50 to 200 parts gas per 100 parts of ammonia solution are sufficient to effect substantially complete removal of $CO_2$ herein. The resulting ammoniacal ammonium carbamate solution usually has the following composition: 25 to 20% ammonia, 60 to 75% ammonium carbamate and 15 to 30% water and as indicated, is recycled to the urea synthesis zone for urea preparation. On the basis of 100 parts urea synthesis reaction mixture, this recycled portion will usually amount to from 20 to 45 parts by weight.

The $CO_2$-removing or washing treatment is preferably carried out in such a way that the gas mixture containing $NH_3$, $CO_2$, inert gas and water vapor is first led into and through the ammoniacal ammonium carbamate solution to be discharged from the $CO_2$-removing zone, the solution collecting in the base of the $CO_2$-washing zone. Thereafter, the gases which have not been absorbed in the solution flow in countercurrent relation through the ammonia solution containing little water. Thus, most of the $CO_2$ is immediately condensed to an ammonium carbamate solution which is already in the base of the $CO_2$-washing zone.

The $CO_2$-free gaseous mixture of $NH_3$ and inert gas leaving the $CO_2$-removing zone may be cooled to between 25 to 65° C., or lower, to condense the major portion of the $NH_3$ therein. Usually, from 75 to 95% by weight of the $NH_3$ in the $NH_3$-inert gas mixture is condensed at this stage.

The amount of condensed $NH_3$ refluxed to the $CO_2$-removing zone depends on the quantity of $CO_2$ to be condensed to ammonium carbamate. As an approximation, it may be said that the heat which is released in the condensation of gaseous $CO_2$ to the ammonium carbamate solution has to be carried away by the refluxed liquid $NH_3$ evaporating in the washing treatment for the $CO_2$ removal, the temperature in the $CO_2$-removing zone being maintained at about 80 to 110° C., at the point where the $CO_2$-containing gas enters the zone and at about 30 to 70° C., at the exit. As an illustration, from 60 to 75% by weight of the condensed $NH_3$ may be refluxed to the $CO_2$-removing zone while the balance is fed to the urea synthesis zone.

The apparatus and method aspects of the present invention are further described below in conjunction with the accompanying diagrammatic drawing.

The reaction components $NH_3$ and $CO_2$ are fed to the urea synthesis apparatus 1 through the lines 18 and 19, respectively. The pressure in the urea autoclave is 150–400 atmospheres. The resulting urea melt, which contains carbamate not yet converted into urea, dissolved $NH_3$, and some water, is expanded to a pressure of 10–45 atmospheres through valve 2, after which the reaction product is led into a liquid-gas separator 4 through a heater 3.

From separator 4, a urea solution containing carbamate flows at the same pressure of 10–45 atmospheres into the stripping column 5. The latter is provided with steam coils or the like so that the solution can be stripped in the column with inert gas fed into the base thereof through line 6.

From the base of column 5, a practically carbamate-free urea solution is discharged through line 7. This solution can be processed to urea crystals or urea prills in the usual way.

From the top of the column 5, a mixture of $NH_3$, $CO_2$, stripping gas, and some water flows away through line 10. Together with the gas spontaneously evolved in the expansion line 8, the mixture is led into the base of column 9, in which it comes into contact with liquid ammonia admitted into the top of the column through line 17, while water in the form of an $NH_4OH$ solution is supplied to column 9 through line 16. As a result, a concentrated solution of ammonia and ammonium carbamate can be discharged from the base of column 9, this solution being fed back into the urea reactor 1 by means of pump 11.

From the top of column 9, $CO_2$-free $NH_3$+stripping gas escape, the $NH_3$ being condensed in condenser 12. Part of the liquid $NH_3$ is refluxed to column 9 and the remainder goes to a buffer tank (not indicated in the drawing) from which $NH_3$ is forced back into the urea autoclave 1 through line 18.

An uncondensed mixture of $NH_3$ and inert gas is also discharged from condenser 12 and fed to a scrubber 13 where the $NH_3$ is washed with water fed in through line 15. The resulting $NH_4OH$ solution is discharged from the base of this scrubber 13 and led into the top of column 9 as washing liquid. The washed inert gases are discharged from the top of scrubber 15 and returned to the stripping column 5 through line 6 and pump 20. As the fresh $NH_3$ and $CO_2$ fed to the urea autoclave 1 always contain a certain percentage of inert matter, as a result of which the circulating quantity of inert material tends to increase, line 6 is provided with a discharge line 21 through which surplus inert material may be discharged.

The invention is further described, but not limited, by the following example:

*Example*

Per hour 1,035 kg. of $NH_3$, 614 kg. of $CO_2$, comprising 11 kg. of inert matter, and a carbamate solution (composition: 452 kg. of $NH_3$, 370 kg. of $CO_2$, and 206 kg. of water), are fed into the reactor 1. This reaction mixture is brought to a pressure of 200 atm. gauge and a temperature of 180° C. as a result of which an hourly quantity of a synthesis melt consisting of 798 kg. of urea, 686 kg. of ammonium carbamate, 736 kg. of $NH_3$, and 446 kg. of water is discharged from the autoclave. This melt is expanded to a pressure of 17 atm. gauge by means of valve 2 and is then led to the liquid vapor separator 4 through the heater 3 at a temperature of about 120° C. The liquid separated off at 4 is then stripped in the stripping column 5 with 123 kg. of nitrogen at a temperature of about 110° C. From the base of the stripping column, 1189 kg. of urea solution, consisting of 798 kg. of urea, 335 kg. of water, and 36 kg. of $NH_3$+$CO_2$, is discharged.

The gases discharged from the stripping column 5 join the gases escaping from the liquid-gas separator 3 at the base of washing column 9. The resulting gas mixture, which consists of 1016 kg. of $NH_3$, 370 kg. of $CO_2$, 91 kg. of $H_2O$ and 134 kg. of inert gas, is washed in countercurrent with liquid ammonia containing water, in the washing column 9, the temperature at the base and top of the column being kept at about 90° C. and about 50° C., respectively. Some of the $NH_3$ escaping from the washing column 9 is condensed by cooling in condenser 12 and partly refluxed into washing column 9, the remainder being returned to the urea synthesis. The gas mixture escaping from condenser 12, consisting of 134 kg. of inert gas and 134 kg. of $NH_3$, is washed with 115 kg. of water in scrubber 13. In this washing step, 249 kg. of $NH_4OH$ solution are obtained and this is also refluxed into washing column 9. From the base of the washing column 9, a carbamate solution consisting of 452 kg. of $NH_3$, 370 kg. of $CO_2$, and 206 kg. of water is discharged and pumped back into the urea reactor 1. 11 kg. of inert material is discharged through line 21, the remainder being led back into the base of the stripping column 5.

In this way, 60.3% of the $CO_2$ is converted into urea at a molar $NH_3/CO_2$ ratio of 3.96 and a molar $H_2O/CO_2$ ratio of 0.52, practically all of the $NH_3$ and $CO_2$ which has not been converted into urea being returned to the urea reactor.

The method according to the invention has the advantage that the expulsion of the carbamate from the carbamate-containing urea melt delivered by the urea reactor, and the subsequent condensation to a concentrated solution of ammonia and ammonium carbamate, are not effected in a number of different pressure stages, but in one stage, in which by the effect of the stripping gas the partial vapor pressure of the $NH_3$ and $CO_2$ over the urea solution to be liberated from carbamate gradually decreases, while the $NH_3$ and $CO_2$ released in this process are condensed at a relatively high pressure in ammonia containing water. On account of this relatively high pressure, it is possible to obtain a concentrated carbamate solution, which can be recycled to the urea synthesis proper in reactor 1 without a substantial decrease in efficiency. Because of the absence of different pressure stages in the recirculation apparatus, the number of columns is reduced to three, viz. the stripping column 5, column 9 for condensing $NH_3$ and $CO_2$ to ammonium carbamate solution, and a washing column 13 for washing $NH_3$ from the inert gases. Moreover, only a few expansion valves are necessary, viz. valve 2, valve 14 in the urea discharge line 7 and a valve in the discharge line 21, and only three simple pumps are required, viz. a pump 11 for forcing the resulting ammonium carbamate solution into the urea reactor, pump 20 for keeping the inert auxiliary gas circulating, and a pump (which does not appear in the drawing) for feeding water to the pressurized scrubber 13 through line 15. Because a uniform pressure is maintained throughout the apparatus, control and operation are simple, and the prevention of operating problems is much easier, so that a highly reliable recirculating apparatus is obtained.

It will be apparent from the foregoing that the apparatus of the invention comprises the following: a reactor for preparing a reaction product containing urea, water, carbamate and $NH_3$; means for withdrawing the reaction product from the reactor; means for reducing the pressure on the reaction product; a carbamate-decomposing and gas stripping vessel; means for feeding the reaction product after pressure reduction into one end of said vessel; means for heating said vessel to decompose the carbamate therein; means for passing an auxiliary inert gas through said vessel countercurrently to said reaction product to strip $NH_3$ and $CO_2$ therefrom; a $CO_2$-removing tower; means for withdrawing a gaseous mixture of inert gas and stripped $NH_3$ and $CO_2$ from the top of the vessel and for feeding this gaseous mixture into the base of the $CO_2$-removing tower; means for feeding ammonia washing liquid into the top of the tower in countercurrent contact with the gaseous mixture whereby $CO_2$ is removed from the gaseous mixture; means for collecting an ammoniacal ammonium carbamate solution in the base of the tower; means for withdrawing this solution from the base of the tower and recycling the same to the reactor; means for removing essentially $CO_2$-free gas from the top of the tower; means for cooling this $CO_2$-free gas to condense $NH_3$ therein; means for feeding a portion of the condensed $NH_3$ into the top of the $CO_2$-removing tower as ammonia washing liquid; means for feeding the balance of the condensed $NH_3$ to the reactor; a second tower; means for withdrawing uncondensed gases from said cooling tower and feeding same into the bottom of the second tower; means for supplying wash water into the top of the second tower for countercurrent washing contact with the uncondensed gases, means for collecting the resulting liquid in the base of the tower; means for recycling this liquid to the top of the $CO_2$-removing tower; and means for recycling the washed gas from the second tower to the decomposing and stripping vessel.

It will be appreciated that various modifications may be made in the invention as described above. Accordingly, the scope of the invention is defined in the following claims wherein, what is claimed is:

1. In a process for preparing urea from $NH_3$ and $CO_2$ using excess $NH_3$ and wherein $NH_3$ and $CO_2$ are reacted in a urea synthesis zone at elevated temperature and pressure to form a liquid reaction mixture including ammonium carbamate and the carbamate in said reaction mixture is thereafter decomposed to urea and $NH_3$ and $CO_2$ not converted to urea are recycled for further reaction, the improvements which comprise expanding the liquid carbamate-containing reaction mixture by reducing the pressure thereon to a pressure of 10–45 atmospheres; then decomposing the carbamate in said liquid reaction mixture to form urea by heating said mixture at said reduced pressure and simultaneously passing an auxiliary gas inert to said reaction mixture counter-currently through said mixture to strip $NH_3$ and $CO_2$ therefrom, thereafter supplying the resulting gaseous mixture containing inert gas, $CO_2$ and $NH_3$ together with any gas evolved in said expansion step, to a $CO_2$-removing zone and passing said mixture of gases counter-currently through an ammonia solution containing little water whereby $CO_2$ is removed from said gases by absorption and an ammoniacal ammonium carbamate solution is obtained, recycling said ammoniacal ammonium carbamate solution to said urea synthesis zone, removing the unabsorbed, essentially $CO_2$-free gaseous mixture of $NH_3$ and inert gas from said $CO_2$-removing zone, cooling said unabsorbed gaseous mixture to condense the major portion of $NH_3$ therein to liquid $NH_3$, refluxing a portion of the thus condensed $NH_3$ to the $CO_2$-removing zone and supplying the remainder of said condensed $NH_3$ to the urea synthesis zone for reaction with $CO_2$, washing the gaseous mixture of $NH_3$ and inert gas which remains after said condensation with water thereby obtaining an essentially $NH_3$-free inert gas and ammoniacal washing liquid, recycling the $NH_3$-free inert gas to said stripping step and feeding the ammoniacal washing liquid to the $CO_2$ removal zone for removal of additional $CO_2$.

2. The process of claim 1 wherein a uniform pressure is maintained through the various steps of said process.

3. Apparatus for preparing urea by reaction of $NH_3$ and $CO_2$ comprising a reactor for preparing a reaction product containing urea, water, carbamate and $NH_3$; means for withdrawing the reaction product from the reactor; means for reducing the pressure on the reaction product; a carbamate-decomposing and gas-stripping vessel; means for feeding the reaction product after pressure reduction into one end of said vessel; means for heating said vessel to decompose the carbamate therein; means for passing an auxiliary inert gas through said vessel countercurrently to said reaction product to strip $NH_3$ and $CO_2$ therefrom; a $CO_2$-removing tower; means for withdrawing a gaseous mixture of inert gas and stripped $NH_3$ and $CO_2$ from the top of the vessel and for feeding this gaseous mixture into the base of the $CO_2$-removing tower; means for feeding ammonia washing liquid into the top of the tower in countercurrent contact with the gaseous mixture whereby $CO_2$ is removed from the gaseous mixture; means for collecting an ammoniacal ammonium carbamate solution in the base of the tower; means for withdrawing this solution from the base of the tower and recycling the same to the reactor; means for removing essentially $CO_2$-free gas from the top of the tower; means for cooling this $CO_2$-free gas to condense $NH_3$ therein; means for feeding a portion of the condensed $NH_3$ into the top of the $CO_2$-removing tower, as ammonia washing liquid; means for feeding the balance of the condensed $NH_3$ to the reactor; a second tower; means for withdrawing uncondensed gases from said cooling tower and feeding same into the bottom of the second tower; means for supplying wash water into the top of the said tower for countercurrent washing contact with the uncondensed gases; means for collecting the resulting liquid in the base of the tower; means for recycling this liquid to the top of the $CO_2$-removing tower; and means for recycling the washed gas from the second tower to the decomposing and stripping vessel.

References Cited in the file of this patent

UNITED STATES PATENTS

| | | |
|---|---|---|
| 1,784,074 | Pauling | Dec. 9, 1930 |
| 2,267,133 | Porter | Dec. 23, 1941 |
| 2,632,711 | White | Mar. 24, 1953 |
| 2,807,574 | Hirano et al. | Sept. 24, 1957 |
| 2,850,360 | Bottenberg | Sept. 2, 1958 |

OTHER REFERENCES

Tonn: Chemical Engineering, volume 62 (October 1955), pages 186–190 (1955).

Harding: Ammonia Manufacture and Uses (1959), pages 25–27.